United States Patent

Tornquist et al.

[11] 4,032,411
[45] June 28, 1977

[54] PROCESS FOR THE PREPARATION OF ETHYLENE DIAMINE HAVING LOW WATER CONTENT

[75] Inventors: Jan Tore Tornquist; Karl Goran Dahlberg, both of Stenungsund, Sweden

[73] Assignee: Berol Kemi AB, Stenungsund, Sweden

[22] Filed: June 13, 1975

[21] Appl. No.: 586,780

Related U.S. Application Data

[63] Continuation-in-part of Ser. No. 448,317, March 5, 1974, abandoned.

[30] Foreign Application Priority Data

Mar. 7, 1973 Sweden .......................... 7303229

[52] U.S. Cl. .................... 203/14; 203/59; 203/73; 260/583 N
[51] Int. Cl.² .......................................... B01D 3/34
[58] Field of Search ................ 203/14, 38, 59, 73; 260/583 P, 583 N

[56] References Cited

UNITED STATES PATENTS

| 3,055,809 | 9/1962 | Lichtenwalter | 202/39.5 |
| 3,137,730 | 6/1964 | Fitz-William | 260/585 |
| 3,394,186 | 7/1968 | Muhlbauer | 260/583 |

FOREIGN PATENTS OR APPLICATIONS 1,258,413  1/1968  Germany .................. 260/583 F

OTHER PUBLICATIONS

Hackh's Chemical Dictionary, 4th Ed.—Grant, McGraw–Hill 1969 p. 222.

*Primary Examiner*—Hiram H. Bernstein

[57] ABSTRACT

A process is provided for the removal of water from a mixture of ethylene diamine and water and for the preparation of ethylene diamine having a water content below the azeotropic equilibrium water content between ethylene diamine and water, by distilling the mixture in the presence of a distillation adjuvant comprising one or more compounds selected from the group consisting of piperazine, diethylene, triamine, hydroxethyl ethylene diamine, and aminoethyl piperazine. The adjuvant can be removed later if desired.

9 Claims, 1 Drawing Figure

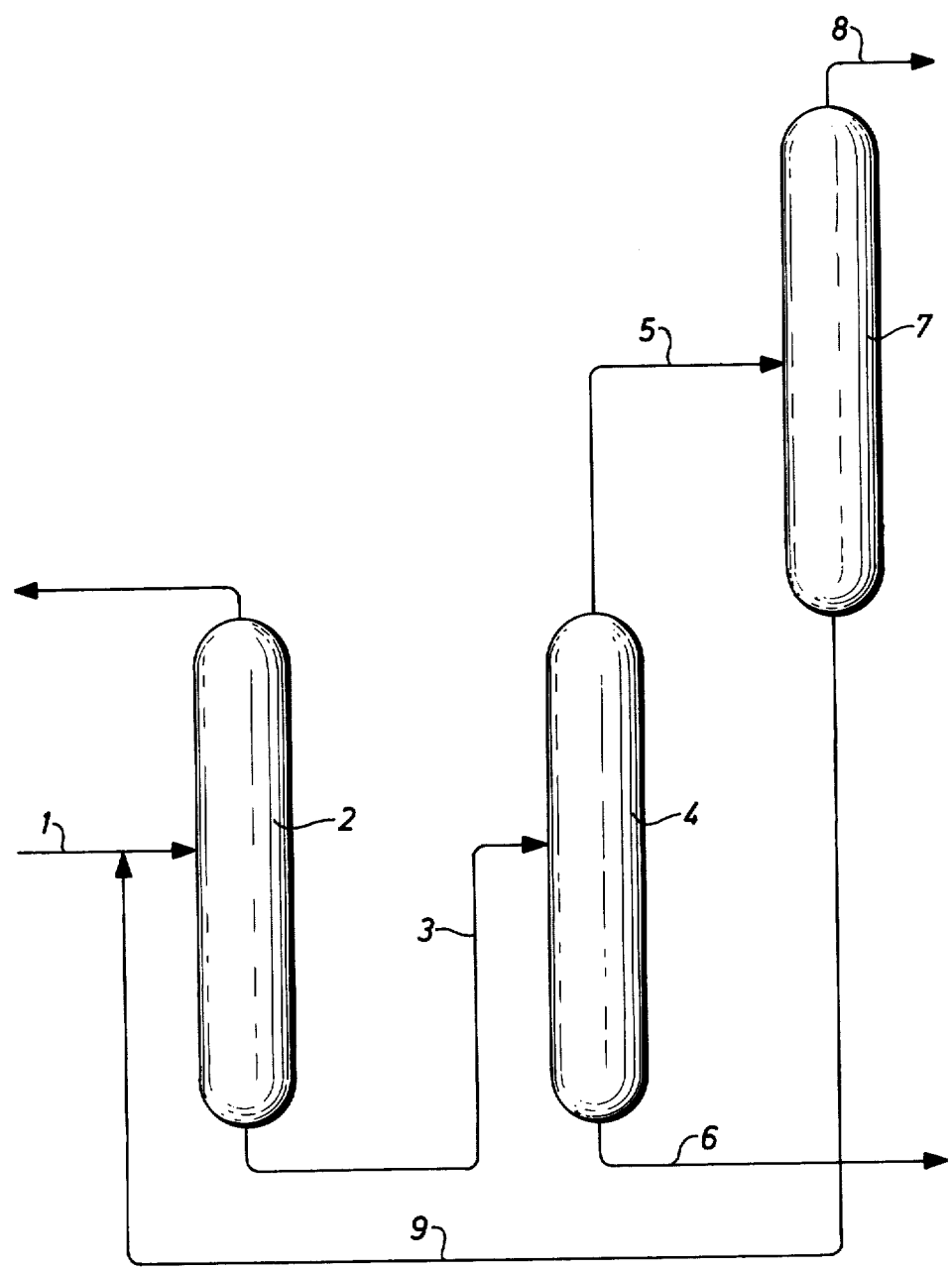

PROCESS FOR THE PREPARATION OF ETHYLENE DIAMINE HAVING LOW WATER CONTENT

This application is a continuation-in-part of Ser. No. 448,317, filed Mar. 5, 1974, and now abandoned.

From Canadian Patent No. 822,113 it is known that ethylene diamine (1,2-diamino ethane) can be prepared from monoethanol amine or ethylene glycol by reaction with ammonia at elevated pressure and temperature in the presence of a hydrogenation catalyst. After the removal of any organic by-products formed, one obtains a mixture of ethylene diamine and water, the water originating from hydroxyl groups present in the raw material. The separation of the ethylene diamine from the water formed is a difficult problem since ethylene diamine and water form an azeotropic mixture boiling at about 118.5° C at atmospheric pressure and having the constant composition of 82% ethylene diamine, the remainder water.

Several methods for the removal of more water and for the preparation of "anhydrous" ethylene diamine have been disclosed in the patent literature. U.S. Pat. No. 3,055,809 and German Auslegeschrift No. 1,129,160 disclose a method for the recovery of anhydrous ethylene diamine from aqueous solutions by extractive distillation with high-boiling solvents, such as ethylene glycol, diethylene glycol or alkanol monoamines. Further, it is known that the composition of the azeotropic mixture between ethylene diamine and water is dependent upon the distillation pressure. Thus, when the pressure is increased the proportion of water in the azeotropic mixture decreases. In German Auslegeschrift No. 1,258,413 this condition is utilized for the preparation of "anhydrous" ethylene diamine by carrying out the distillation under elevated pressure. However, the use of any of these methods means in practice that the separation becomes complicated and expensive. Therefore, for a long time there has been a need for novel and improved methods for the separation of ethylene diamine from water.

In the catalytic amination of monoethanol amine or ethylene glycol in the presence of ammonia there are also formed, in addition to the ethylene diamine, other ethylene amines, such as piperazine, diethylene triamine, hydroxyethyl ethylene diamine and aminoethyl piperazine. It has now surprisingly been found that the presence of said ethylene amines favorably influences the separation of water upon distillation at about or slightly above atmospheric pressure. Extensive investigations have shown that the presence of these amino compounds as distillation adjuvants makes it possible to remove water from the ethylene diamine without the formation of any azeotrope. Therefore, the present invention relates to a process for the preparation of ethylene diamine having a water content below the azeotropic equilibrium water content, i.e., about 18% water by weight at normal pressure and temperature, from a mixture of ethylene diamine and water by distillation of the mixture in the presence of a nonazeotroping distillation adjuvant selected from the group consisting of piperazine, diethylene triamine, hydroxyethyl ethylene diamine, aminoethyl piperazine, and mixtures of one or more thereof, in an amount sufficient to permit removal of water from the ethylene diamine without the formation of any azeotrope. Following such distillation the distillation adjuvant, if desired, can be removed using known procedures.

The distillation according to the invention is carried out at a pressure of from about 1 to about 3 atmospheres while the temperature at the bottom of the distillation column may vary between about 140° and about 210° C at the head of the column between about 100° and about 130° C. In order for the distillation to be carried out under technically appropriate conditions, and permit removal of water from the ethylene diamine without the formation of any azeotrope, the weight ratio between the distillation adjuvant and the ethylene diamine should be within the range from about 2:8 to about 9:1, preferably from about 4:6 to about 8:2.

Piperazine, diethylene triamine, hydroxyethyl ethylene diamine and aminoethyl piperazine are formed in admixture as stated above, upon catalytic amination of monoethanol amine or ethylene glycol in the presence of ammonia. From this it is evident that the process of the invention is especially suitable when the ethylene diamine is prepared by catalytic amination in this way since in this case the components of the nonazeotroping distillation adjuvant are present as by-products in the reaction mixture. However, mixtures of ethylene diamine and water prepared in other ways can also be distilled in the process of the invention to obtain ethylene diamine of low water content. One or more of the nonazeotroping amino compounds stated above can be added to such mixtures of ethylene diamine and water, or they can be added separately to the distillation column.

The distillation process of the invention can be carried out in such a way that the distillation adjuvants can be recovered and recirculated. Also when distilling mixtures of ethylene diamine and water obtained by catalytic amination as stated above and containing distillation adjuvants of the invention as by-products, an adjuvant recirculation may be desirable since this will facilitate the control of the distillation process.

When preparing ethylene diamine having a very low water content, i.e., below 2% by weight, by distillation with an adjuvant in accordance with the invention it is usually suitable to carry out the last part of the distillation in vacuo in the absence of the adjuvant. Extensive investigations have shown that by carrying out the distillation in one single step, a column having a relatively large number of theoretical plates would be required. Furthermore, a single distillation would require such a high bottom temperature that serious decompositon of the amino compounds present may occur. Therefore, a particularly preferred embodiment of the invention comprises the steps of firstly removing the major proportion of the water present in the aqueous ethylene diamine solution by carrying out the distillation in the presence of one or more of the adjuvants, then removing the adjuvant and finally carrying out a distillation in vacuo in order to remove additional water.

In the enclosed drawing FIG. 1 shows schematically apparatus for carrying out the preferred embodiment of the invention.

A mixture containing ethylene diamine and water is fed through a line 1 to a distillation column 2 containing about 10–40 theoretical plates operating at or slightly above atmospheric pressure. The temperature at the bottom of the column is kept between 140° and 190° C. while the head of the column has a temperature between 100° and 130° C. In addition to ethylene diamine and water the reaction mixture also contains large amounts of one or more of the compounds piperazine, diethylene triamine, hydroxyethyl ethylene diamine and aminoethyl piperazine in proportions within the range stated. The major proportion of the water present in the mixture is withdrawn at the head of the column while a minor proportion is allowed to accompany a bottom stream 3 also containing ethylene diamine and the other amino compounds. The amount of water in the stream 3 varies according to the bottom temperature and also influences the size of the stream 9 later recirculated. Suitably the stream 3 contains 1–6% by weight of water. In a distillation column 4 containing about 15–60 theoretical plates the ethylene diamine and the water are separated from the more high-boiling amines present which are removed through a line 6. The mixture of ethylene diamine and water is fed from the head of column 4 through a line 5 to a column 7 containing about 5–25 theoretical plates operating at a reduced pressure. The pressure is suitably kept at 10–500 mm Hg, preferably at 50–200 mm Hg. The temperature in the column varies according to the pressure but usually lies within the range from 60° to 85° C. From the head of the vacuum column 7 a practically anhydrous ethylene diamine 8 is withdrawn while an azeotropic mixture of ethylene diamine and water is withdrawn from the bottom of the column and is recirculated through a line 9 to line 1 and is fed to the column 2.

The following examples further illustrate the invention.

EXAMPLE 1

A mixture of 27 parts by weight of water, 27 parts by weight of ethylene diamine and 46 parts by weight of a mixture of piperazine, diethylene triamine, aminoethyl ethanol amine, aminoethyl piperazine and ethanol amine was distilled continuously at atmospheric pressure in a glass column having an internal diameter of 3 cm. and a length of 250 cm. and included in a plant of the type described in FIG. 1. The column was provided with 65 sieve trays. The mix was fed continuously to the sixteenth tray, counted from the head of the column. The composition of the mixture of amines, distillation adjuvants and water used in the experiment corresponded to that of the reaction product obtained (after stripping of the excess of ammonia and hydrogen gas) in the known reaction between monoethanol amine and ammonia at elevated pressure and temperature in the presence of catalysts consisting of nickel and/or cobalt. At a temperature of 100° C in the vapor phase and a liquid temperature of 159° C in the distillation flask one obtained a distillate which upon titrimetric analysis proved to consist of practically pure water. The distillation still contained 2.6 parts by weight of water and 97.4 parts by weight of amines. Upon separation of water and ethylene diamine from the other amines by distillation at reduced pressure the mixture of ethylene diamine and water was distilled by a renewed distillation in the apparatus described, the mixture being fed to the thirty-first tray, counted from the head. This distillation was carried out at 100 mm Hg. The distillate temperature was 64° C and the bottom temperature in the liquid was 79° C. The distillate consisted of ethylene diamine containing 0.5 part by weight of water. The content of the distillate still consisted of the azeotropic mixture of 75 parts by weight of ethylene diamine and 25 parts by weight of water.

EXAMPLE 2

In a plant for the continuous preparation of ethylene diamine by catalytic amination of ethanol amine 560 grams/hour of a mixture of 68.0% by weight of ammonia, 28.4% of monoethanol amine and 3.6% by weight of water were reacted over 100 grams of reduced hydrogenation catalyst comprising 4% by weight each of nickel, cobalt and iron supported on a carrier of alumina. The reaction was carried out in the presence of hydrogen gas at 225° C at a pressure of 280 atmospheres. The conversion of monoethanol amine was 55% and the product yield, based on monoethanol amine converted, was 60% ethylene diamine, 12% piperazine, 7% diethylene triamine, 12% hydroxyethyl ethylene diamine, 2% aminoethyl piperazine and 2% hydroxyethyl piperazine. In the same way as described in Example 1 the product mixture was distilled at atmospheric pressure upon stripping of the excess of ammonia and hydrogen gas. The amine mixture obtained after the distillation contained 1.9 parts by weight of water.

In another batch distillation with a column containing 53 theoretical plates at 400 mm Hg the amine mixture was separated into two fractions. One fraction was withdrawn at 110°–115° C and consisted of 11% by weight of water, 79% by weight of ethylene diamine and 10% by weight of piperazine. This fraction was distilled once more at atmospheric pressure and at a temperature of 118°–119° C. piperazine being removed and a fraction containing 12% by weight of water and 88% by weight of ethylene diamine being obtained.

In a distillation at 80 mm Hg carried out in a way similar to that described in Example 1, the bottom temperature being 61° C, there was obtained as distillate ethylene diamine containing 1% by weight of water.

EXAMPLE 3

Monoethanol amine was reacted batchwise to ethylene diamine, piperazine and higher ethylene amines in the presence of a catalyst comprising nickel magnesia. Upon stripping of the excess of ammonia the reaction product was freed from water in a way similar to that of Example 1. Ethylene diamine containing 0.2% by weight of water was obtained.

EXAMPLE 4

Monoethanol amine was reacted batchwise in a way similar to that of Example 3 but using 7.5 parts by weight of reduced cobalt catalyst, 39.7 parts by weight of monoethanol amine, 29 parts by weight of water and 55.4 parts by weight of ammonia. The amination reaction was then carried out at 225° C in the presence of hydrogen gas.

After a reaction time of two hours gas chromatographic analysis showed that 86% of the monoethanol amine charged had been reacted. Of the amount of monoethanol amine charged 33% piperazine, 24% ethylene diamine, 11% aminoethyl ethanol amine, 7% hydroxyethyl piperazine, 6% aminoethyl piperazine and 2% diethylene trimine were formed.

The aqueous reaction product was distilled firstly at atmospheric pressure and then at reduced pressure in a way similar to that of Example 1. There was obtained ethylene diamine containing 0.5% by weight of water.

Having regard to the foregoing disclosure, the following is claimed as the inventive and patentable embodiments thereof.

1. A process for the removal of water from a mixture of ethylene diamine and water, and for the preparation of ethylene diamine having a water content below the azeotropic equilibrium water content of ethylene diamine and water, which comprises vaporizing off water without formation of any azeotrope from a mixture comprising ethylene diamine, water and a nonazeotroping distillation adjuvant selected from the group consisting of piperazine, diethylene triamine, hydroxyethyl ethylene diamine, aminoethyl piperazine, and mixtures of said adjuvants, in an amount within the weight ratio range from about 2:8 to about 9:1 of distillation adjuvant: ethylene diamine, sufficient to permit vaporization of water from the ethylene diamine without formation of any azeotrope; and then distilling off and recovering as distillate ethylene diamine containing an amount of water less than said azeotropic equilibrium water content.

2. A process according to claim 1, which comprises removing the distillation adjuvant from the distillate upon completion of the distillation.

3. A process according to claim 1, in which the mixture of ethylene diamine and water is the reaction product of the catalytic amination of a member selected from the group consisting of monoethanolamine and ethylene glycol with ammonia, and containing distillation adjuvant formed as a by-product in the catalytic amination.

4. A process according to claim 1, in which the distillation adjuvant is a mixture of piperazine, diethylene triamine, hydroxyethyl ethylene diamine and aminoethyl piperazine.

5. A process according to claim 1, in which the weight ratio of distillation adjuvant to ethylene diamine is within the range from about 4:6 to about 8:2.

6. A process according to claim 1, which comprises distilling the mixture at a pressure of from about 1 to about 3 atmospheres.

7. A process according to claim 1, which comprises at a later stage of the process removing distillation adjuvant from the distillation mixture and then distilling the residual mixture comprising ethylene diamine having a water content below 18% by weight under vacuum in the absence of distillation adjuvants to remove additional water.

8. A process according to claim 7, in which the distillation under vacuum is carried out at a pressure within the range of from about 10 to about 500 mm Hg.

9. A process according to claim 7, in which the distillation under vacuum is carried out at a pressure within the range of from about 50 to about 200 mm Hg.

* * * * *